(12) United States Patent
Fish et al.

(10) Patent No.: US 7,788,225 B2
(45) Date of Patent: Aug. 31, 2010

(54) APPARATUS AND METHOD FOR IDENTIFYING ASYNCHRONOUS DATA IN REDUNDANT DATA STORES AND FOR RE-SYNCHRONIZING SAME

(75) Inventors: Eric Ian Fish, Kentfield, CA (US); Scott Roger Corbin, Spooner, WI (US); Joel Shepherd, Golden, CO (US); George Allen Pearson, Pleasant Hill, CA (US); Timothy Lee Rathbun, Danville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 760 days.

(21) Appl. No.: 11/084,855

(22) Filed: Mar. 18, 2005

(65) Prior Publication Data

US 2006/0212465 A1    Sep. 21, 2006

(51) Int. Cl.
*G06F 12/00* (2006.01)
(52) U.S. Cl. ..................................................... 707/624
(58) Field of Classification Search ................. 707/624
See application file for complete search history.

(56) References Cited

U.S. PATENT DOCUMENTS

| | | | | |
|---|---|---|---|---|
| 5,884,325 | A * | 3/1999 | Bauer et al. ................ | 707/201 |
| 6,321,236 | B1 * | 11/2001 | Zollinger et al. ............ | 707/203 |
| 6,449,622 | B1 * | 9/2002 | LaRue et al. ................ | 707/201 |
| 6,591,351 | B1 * | 7/2003 | Urabe et al. ................ | 711/162 |
| 7,024,528 | B2 * | 4/2006 | LeCrone et al. ............. | 711/162 |
| 7,162,596 | B2 * | 1/2007 | Popp et al. ................. | 711/162 |
| 7,363,431 | B1 * | 4/2008 | Niver et al. ................. | 711/141 |
| 7,415,467 | B2 * | 8/2008 | Jeevanjee et al. ............. | 707/8 |
| 2002/0055939 | A1 * | 5/2002 | Nardone et al. .......... | 707/104.1 |
| 2002/0059299 | A1 * | 5/2002 | Spaey ...................... | 707/104.1 |
| 2003/0177323 | A1 * | 9/2003 | Popp et al. ................. | 711/162 |
| 2003/0231647 | A1 | 12/2003 | Petrovykh | |
| 2004/0215670 | A1 * | 10/2004 | Holenstein et al. .......... | 707/201 |
| 2004/0249870 | A1 * | 12/2004 | Jeevanjee et al. ............ | 707/204 |
| 2006/0136443 | A1 * | 6/2006 | Dulay et al. ................ | 707/101 |
| 2006/0190503 | A1 * | 8/2006 | Naicken et al. ............. | 707/204 |
| 2007/0100912 | A1 | 5/2007 | Pareek et al. | |
| 2007/0299885 | A1 | 12/2007 | Pareek et al. | |
| 2008/0046479 | A1 | 2/2008 | Pareek et al. | |
| 2009/0217274 | A1 | 8/2009 | Corbin et al. | |

\* cited by examiner

*Primary Examiner*—Hung Q Pham
*Assistant Examiner*—Hubert Cheung
(74) *Attorney, Agent, or Firm*—Townsend and Townsend and Crew LLP

(57) ABSTRACT

A computer readable medium includes executable instruction to compare databases. The executable instructions are configured to identify when a segment of a first database is conditionally out of synchronization with a corresponding segment of a second database to establish a conditionally out of synchronization state at a first time. Executable instructions allow a latency period after the first time in which changes are made to the first database and the second database. Executable instructions also determine after the latency period whether the segment of the first database is in synchronization with the corresponding segment of the second database. Executable instructions also populate a resynchronization table, which is used by a replication mechanism to bring asynchronous rows into synchronization.

18 Claims, 2 Drawing Sheets

APPARATUS AND METHOD FOR IDENTIFYING ASYNCHRONOUS DATA IN REDUNDANT DATA STORES AND FOR RE-SYNCHRONIZING SAME

BRIEF DESCRIPTION OF THE INVENTION

This invention relates generally to electronic data storage. More particularly, this invention relates to a technique for identifying asynchronous data in two different computer network locations that are supposed to maintain identical data. Further, the invention relates to re-synchronizing identified asynchronous data.

BACKGROUND OF THE INVENTION

Many enterprises store the same electronic data in more than one location. Reasons for this include improving the security and availability of this information in the event of computer outage, malfunction or disaster, as well as the ability for multiple entities and applications to manage the same information independently. As a consequence, when data changes in one data source it often needs to be copied to one or more secondary data sources, through a variety of possible mechanisms, including data replication. There are a number of challenges associated with data replication. For example, it is important to be able to independently verify that a replication mechanism is accurate. That is, it is important to confirm that data that should be copied from one location to another is indeed copied. When data sources are out of synchronization (i.e., asynchronous), it is important to re-synchronize them as efficiently as possible. These comparison and re-synchronization activities need to be performed in the context of the following constraints: high activity/rate of change in the data source, a dynamic environment in which there is no opportunity to turn off the application or database to perform a static comparison, and geographic separation accompanied by limited bandwidth between data sources.

In view of the foregoing, it would be highly desirable to provide an improved technique for data comparison and re-synchronization operations.

SUMMARY OF THE INVENTION

The invention includes a computer readable medium with executable instruction to compare databases. The executable instructions are configured to identify when a segment of a first database is conditionally out of synchronization with a corresponding segment of a second database to establish a conditionally out of synchronization state at a first time. Executable instructions allow a latency period after the first time in which changes are made to the first database and the second database. Executable instructions also determine after the latency period whether the segment of the first database is in synchronization with the corresponding segment of the second database.

The invention provides an efficient mechanism for comparing structurally similar or dissimilar tables over connections that support limited bandwidth and/or where the volume of data transported over the connection is very large. The invention facilitates the processing of segments or subsets of databases over time. The invention also efficiently accommodates "in flight" table data by using a latency period to confirm an asynchronous state.

The invention provides an enterprise infrastructure software platform to enable data movement, data management, and data integration at high speeds, high volumes, and across diverse environments. The invention is successfully used in connection with banking, financial services, healthcare, cable, telephone, public sector, and aerospace industries.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
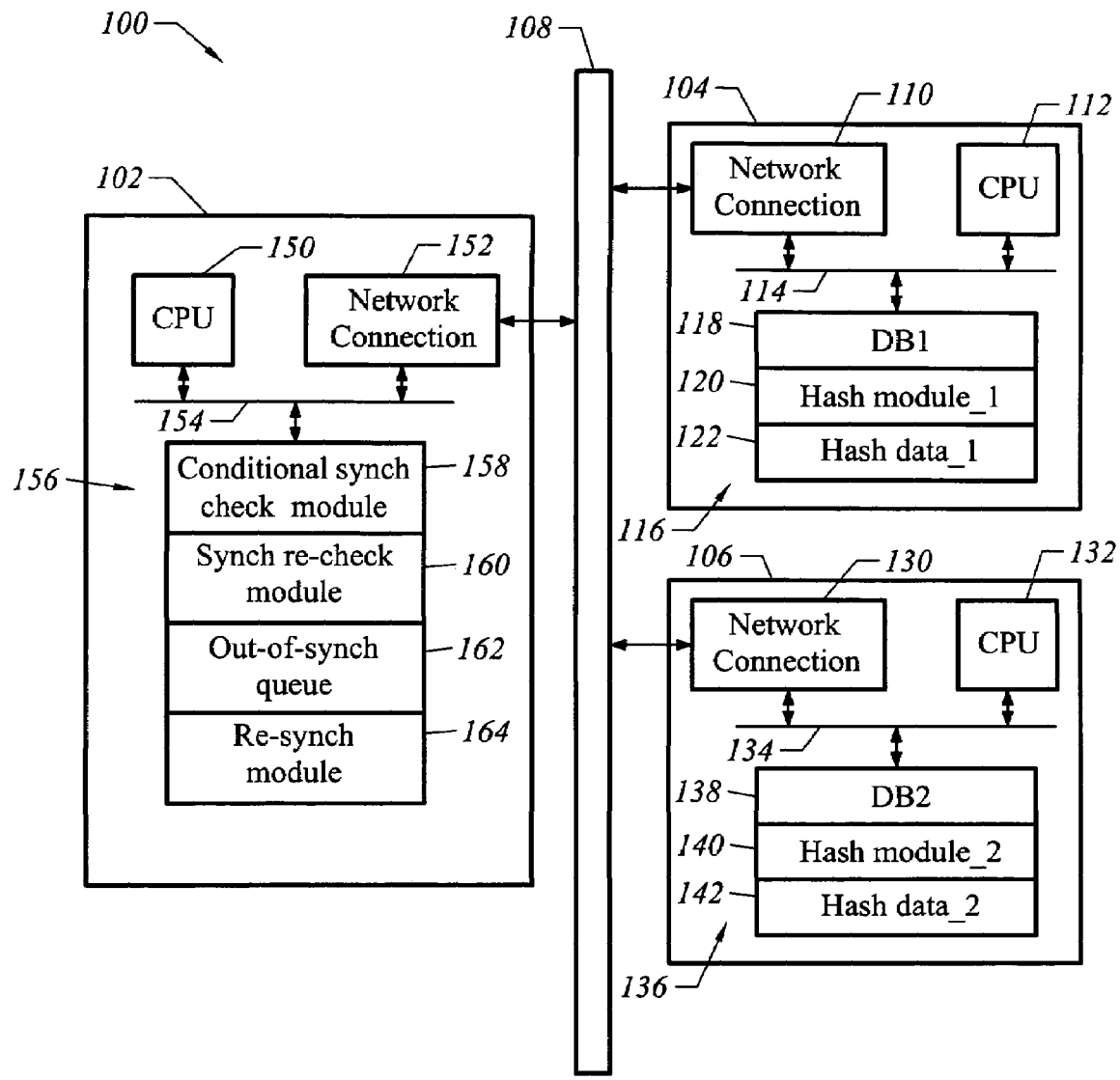
FIG. 1 illustrates a network implementing an embodiment of the invention.

FIG. 1 illustrates a computer network 100 configured in accordance with an embodiment of the invention. The network 100 includes a first computer 102, a second computer 104, and a third computer 106. The computers 102, 104, and 106 are linked by a transmission medium 108, which may be any wired or wireless network.

Computer 104 includes standard computer components, including a network connection circuit 110 and a central processing unit 112 connected by a bus 114. Also connected to the bus 114 is a memory. The memory stores a first database (DB1) 118. Also stored in the memory 116 is a hash module 120, which is configured as a set of executable instructions to perform a hash operation on a segment of the database 118, as discussed further below. The hash module 120 produces hash data 122. The hash module 120 conveys the hash data 122 to computer 102.

Computer 106 also includes standard computer components, including a network connection circuit 130 and a central processing unit 132 connected by a bus 134. Memory 136 stores a second database (DB2) 138. Memory 136 also stores an executable hash module 140, which produces hash data 142 from a segment of data in the second database 138. The segment of data in the second database 138 corresponds to the segment of data in the first database 118, which was processed to produce the first set of hash data 122. The hash module 140 includes executable instructions to convey the second hash data 142 to the computer 102. Thus, the computer 102 receives the results of the first hash operation performed on computer 104 and the results of the second hash operation performed on computer 106. Since corresponding portions of the first database 118 and the second database 138 were processed, the hash data should correspond if the contents of the two database segments are identical. If the segments are different, then it is very likely that the hashes will be different. Observe that the transmission of hash data significantly reduces network traffic and otherwise facilitates an expeditious technique for comparing database contents.

Computer 102 includes standard components of a central processing unit 150, a network connection circuit 152, and a system bus 154. The computer 102 also has a memory 156, which stores executable programs configured to implement operations of the invention. In one embodiment of the invention, the memory 156 stores a conditional synchronization check module 158. This module 158 compares the first hash data 122 to the second hash data 142. If the hash data is not equivalent, then a conditionally out of synchronization state exists. The conditional synchronization check module 158 then creates a pause to allow for a latency period following the identification of the conditionally out of synchronization state. The latency period allows the databases to potentially synchronize through existing synchronization mechanisms. After the latency period, the hash modules 120 and 140 supply hash data 122 and 142 to the computer 102 and the synchronization re-check module 160 is invoked. This module 160 compares the most recently received hash data 122 and 142. If the hash values are identical, then the databases are no longer considered to be conditionally out of synchronization. On the other hand, if the hash results are inconsistent, then the databases are considered to be out of synchronization. At this point, the synchronization re-check module 160 loads information about the database segments into an out-of-synchronization queue 162. A re-synchronization module 164 then performs various processing operations to establish synchronization between the databases, details of which are discussed below.

Figure 2:
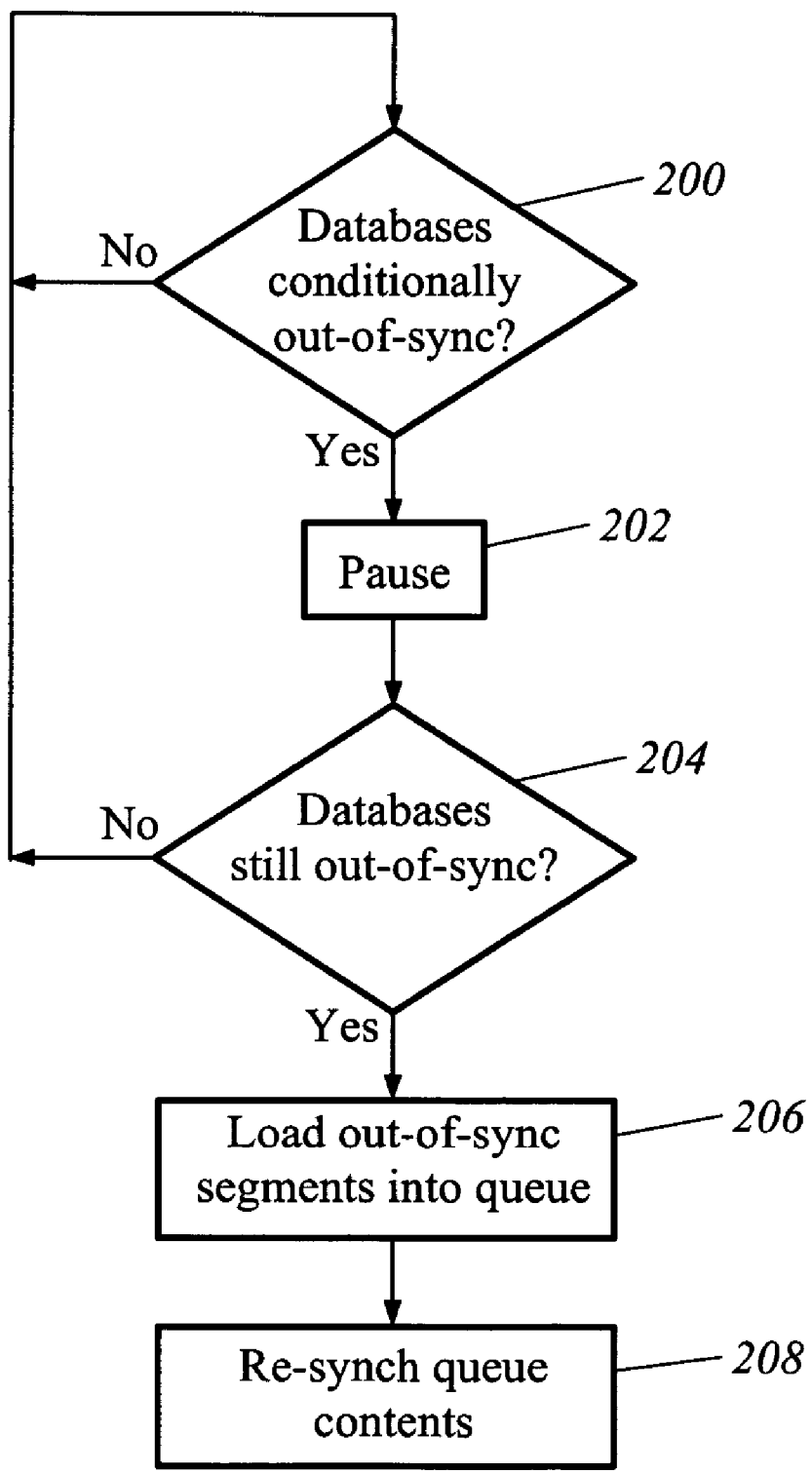
FIG. 2 illustrates processing operations associated with an embodiment of the invention.

FIG. 2 illustrates processing operations associated with an embodiment of the invention. The first processing operation of FIG. 2 is to determine whether the databases are conditionally out-of-synchronization 200. As previously discussed, the conditional synchronization check module 158 may be used to implement this operation. If the databases are not out of synchronization, processing returns to block 200. If the databases are conditionally out of synchronization, a pause or latency period is invoked 202. Afterwards, it is determined whether the databases are still out of synchronization (block 204). If not, then processing returns to block 200. If so, then information regarding the database segments is loaded into an out of synchronization queue 206. The synchronization re-check module 160 may perform these operations. The re-synchronization module 164 may then be invoked to re-synchronize the contents within the out of synchronization queue 208.

Many variations of the processing of FIG. 2 may be utilized in accordance with embodiments of the invention. For example, if processing is being performed on a row-by-row basis, one will initially determine at block 200 if there are more database segments or rows in the database. If so, a determination is made to see if the database segment is out of synchronization. If so, then pause 202. If a lack of synchronization persists 204, the segment is loaded into the queue 206. At this point, the next row is fetched and processing returns to block 200.

Primary operations associated with an embodiment of the invention have been described. Attention now turns to more detailed discussions of various embodiments of the invention. It should be appreciated that all descriptions of the invention are for the purpose of disclosing the nature of the invention and therefore should not be interpreted as limiting the invention to the particular embodiment disclosed. For example, the network configuration of FIG. 1 is exemplary. The databases and executable modules may be distributed in any number of ways in a networked environment. It is the operations of the invention that are significant, not where those operations are performed.

The techniques of the invention are applicable to a variety of data storage mechanisms. However, by way of example, the invention is disclosed in the context of databases. That is, the invention is disclosed in the context of techniques used to compare and synchronize rows within tables, and tables within databases. The terms rows, tables and databases are used to describe general methods for storing related information. A common example of a database is a relational database. The invention is also applicable to other types of databases, such as a hierarchical database (e.g. IBM® IMS) or a key-based database (e.g., HP® Enscribe). With these types of databases, rows are often referred to as records, and columns as fields.

In addition, a table might also be thought of as an eXtendable Markup Language (XML) document or even a section within an XML document or similar "semi-structured" data that offers a consistent way of delineating "rows", "columns" and "tables". This could also include spreadsheets and other document and file types. A table can also be thought of as a logical union of related data or subset of data, such as an SQL view.

Tables 1 and 2 are examples of database tables respectively specifying products and orders.

PRODUCT Table (columns are Product Number, Product Name, Number of Wheels)

TABLE 1

|  | Product Number | Product Name | Number of Wheels |
|---|---|---|---|
| Row 1 | 100 | Car | 4 |
| Row 2 | 200 | Boat | 0 |
| Row 3 | 300 | Truck | 18 |

ORDER Table (columns are Order Number, Product Number, Price)

TABLE 2

|  | Order Number | Product Number | Price |
|---|---|---|---|
| Row 1 | 1 | 100 | 20000 |
| Row 2 | 1 | 200 | 15000 |
| Row 3 | 2 | 200 | 9000 |
| Row 4 | 5 | 100 | 30000 |

A "unique key" (UK) in each table is a set of columns within the table used to uniquely identify each row within the table. For example, in the PRODUCT table, Product Number is a unique key because it never repeats in the table. In the ORDER table, Order Number is not unique because it repeats (the value 1 appears twice). However, a combination of Order Number and Product Number constitutes a unique key (there are no repetitions in (1,100), (1,200), (2,200), (5,100)).

An access method provides a way of retrieving data from tables within a database. Retrieval options include methods for retrieving all rows from the database, specific rows based on key, specific columns and computations on row and column subsets. Example access methods include SQL, ODBC, ISAM, Oracle OCI, stored procedures and many others. Access methods can also be thought of as a way to retrieve data from documents that have some of the same characteristics as databases (such as XML documents and spreadsheets).

As used herein, the terms source and target are used to describe the direction of data flow of redundant data from one database to another or one table to another. Often this is a predefined one-way flow. For example, if replication is being used to move data from database PRIMARY to database BACKUP, database PRIMARY and tables within it are considered to be a "source" and BACKUP and tables within it are considered to be the "target".

In addition, the data flow between source and target may be specified in other ways, such as:

a specific subset of rows (as defined by a unique key) is designated the "source" in TABLE1 and the "target" in TABLE2, while another subset of rows is designated the "source" in TABLE2 and the "target" in TABLE1 either table can modify any row, and that row is then copied to the other system Table comparison involves two tables. Two tables are synchronized (i.e., "in sync") if the following conditions are true:

all rows in one table can be found in the other table, as identified by a unique key (corresponding rows)

all columns within each row match all columns in the corresponding row in the other table This definition covers tables that have the same structure and row contents. Consider the following tables.

PRODUCT1 Table

TABLE 3

|  | Product Number | Product Name | Number of Wheels |
|---|---|---|---|
| Row 1 | 100 | Car | 4 |
| Row 2 | 200 | Boat | 0 |
| Row 3 | 300 | Truck | 18 |
| Row 4 | 400 | Bicycle | 2 |

PRODUCT2 Table

TABLE 4

|  | Product Number | Product Name | Number of Wheels |
|---|---|---|---|
| Row 1 | 100 | Car | 4 |
| Row 2 | 150 | Motorcycle | 2 |
| Row 3 | 200 | Boat | 0 |
| Row 4 | 300 | Truck | 6 |

In this example, the two tables are out of synchronization (synch):
1. Rows 1 and 2 in PRODUCT1 match Rows 1 and 3 in PRODUCT2 (the unique key Product Number matches in each, and the other columns match as well)
2. There is no corresponding entry for Row 4 in PRODUCT1 inside PRODUCT2, so that row is out-of-sync (Product Number 400 cannot be found in PRODUCT2)
3. There is no corresponding entry for Row 2 of PRODUCT2 inside PRODUCT1 (Product Number 150 not found)—that row is out of sync
4. Product Number 300 if found in both tables (PRODUCT1 Row 3, PRODUCT2 Row 4)—but the Number of Wheels is different—that row is out of sync Attention now turns to some examples of "similarly structured" or "overlapping" tables. Even though data is not exactly the same in these types of tables, selected data (columns and/or rows) flows between the tables to ensure that overlapping data is kept in sync appropriately.

Consider the following example, which relates to the case of overlapping columns. In this example, some columns are the same, while some are different.

PROD Table

TABLE 5

|  | Product Number | Product Name | Number of Wheels | In Stock |
|---|---|---|---|---|
| Row 1 | 100 | Car | 4 | Yes |
| Row 2 | 200 | Boat | 0 | Yes |

PRODUCT Table

TABLE 6

|  | Product Number | Product Name | Description | Wheel Count |
|---|---|---|---|---|
| Row 1 | 100 | Car | Land Vehicle | 4 |
| Row 2 | 200 | Boat | Good for Water | 0 |

In this example, the two tables are not exactly the same, but could be considered in sync, because "overlapping" columns are in sync (Product Number and Number of Wheels/Wheel Count). In these types of cases, which columns are overlapping is defined by the users of the tables, rather than in the obvious case above where everything is exactly the same.

Now consider overlapping rows. Overlapping row sets can be considered in sync.

BASEBALL_TEAMS Table

TABLE 7

|  | Team Name | Region | Wins |
|---|---|---|---|
| Row 1 | Giants | WEST | 82 |
| Row 2 | Yankees | EAST | 75 |
| Row 3 | Dodgers | WEST | 63 |
| Row 4 | Red Sox | EAST | 74 |

WEST_TEAMS Table

TABLE 8

|  | Team Name | Wins | Team Type |
|---|---|---|---|
| Row 1 | Giants | 82 | Baseball |
| Row 2 | Dodgers | 60 | Baseball |
| Row 3 | Lakers | 20 | Basketball |

In this case, a subset of teams in the BASEBALL_TEAMS table (rows where region is "WEST") is compared with the rows in the WEST_TEAMS table where the team type is "Baseball". In this example, only one row would be out-of-sync ((Dodgers, 63), (Dodgers, 60)). Rows 2 and 4 are excluded from the row set returned for BASEBALL_TEAMS because corresponding row information is not expected in the WEST_TEAMS table. Similarly, row 3 in WEST_TEAMS is not expected to have an entry in the BASEBALL_TEAMS table because it is a basketball team. In addition, a subset of columns is used (Region is not part of WEST_TEAMS, and Team Type is not part of BASEBALL_TEAMS). Note that combinations of overlapping columns and overlapping rows could be compared as well.

Consider now a mapped data case. The following example illustrates different data values that mean the same thing. As data flows from one system to another, this is known as "Data Mapping". To extend the above example, the NATIONAL_LEAGUE Table might look like this:

TABLE 9

|  | Team Name | Wins | Short Region |
|---|---|---|---|
| Row 1 | Giants | 82 | W |
| Row 2 | Dodgers | 60 | W |

In this case, the Region in ALL_TEAMS is equivalent to Short Region in NATIONAL_LEAGUE even though the precise values are different.

The invention may be used in connection with heterogeneous data stores. Heterogeneous data stores may store the exact same information differently. For example:

ORACLE_ORDER Table

TABLE 10

|       | Order ID | Order Date |
|-------|----------|------------|
| Row 1 | 00100    | 04AUG2004  |
| Row 2 | 00200    | 10NOV2003  |

SYBASE_ORDER Table

TABLE 11

|       | Order ID | Order Date  |
|-------|----------|-------------|
| Row 1 | 100.00   | 2004-AUG-04 |
| Row 2 | 200.00   | 2003-NOV-10 |

In each of these tables, the value of the data is actually the same, but represented differently.

One aspect of the invention is to compare tables using a row hash technique. Consider the situation where the table data to be compared resides in database 1 (DB1) and database 2 (DB2). A Compare Client (CC) process (e.g., implemented as the conditional synchronization check module 158) establishes connectivity to two Host Server (HS) processes (e.g., on computers 104 and 106), one for each table to compare. One Host Server process is used to retrieve table data for each table to be compared. For maximum efficiency, the connection between the HS and DB is usually on the same system or over a very high-speed network, because potentially high amounts of data are flowing between each HS and DB.

The HS processes and CC process may be located anywhere in a network (including on the same systems as each other, some on the same system, or all on different systems). It is also possible that the CC and HS components on one of the systems run in the same process (as different threads or in the same thread).

Each HS process then retrieves each row from its corresponding table, sorted in unique key order. Each row retrieved consists of one or more columns of data (as defined by the database itself or via user-supplied metadata). Row retrieval is accomplished in a variety of ways depending on the type of database and the access methods it provides (examples include SQL, ODBC, Oracle OCI, ISAM, etc.).

The HS then "packs" the following data for each row into a memory buffer. That is, the HS packs all columns that make up a unique key for the row and the HS also packs a "row hash" of the remaining columns in the row.

A hash is defined here as a numerical computation over a set of bytes that is always the same for that given set of bytes (in a particular order), but that has a very low probability of being the same for a different set of bytes (for example, the set of bytes "AB" is considered different than any of the sets of bytes "123", "BA", "ABC"). In this case, the set of bytes is the data for each column, where each column is converted into a standard format for the data type of the column. The hash is used to reduce the amount of data that needs to be transferred in order for a comparison of two rows to take place.

One example of a hash computation is a cyclical redundancy check (CRC). For example, a 32 bit CRC could be computed over 500 bytes of row data, reducing the amount of data to be transferred for that row from 500 bytes to 4 bytes. In such a scenario, 4 bytes for each row could be compared to determine whether two rows are in sync, rather than 500 bytes. This effectively shrinks the total amount of data to transfer dramatically, and proportionally enlarges the amount of data that can be compared over a given network in a given time period.

In addition, the HS packs the individual row information—unique keys plus hashes—into larger blocks of rows, which are in turn compressed and transferred in larger messages over the network, back to the CC. Compression techniques include widely available algorithms such as the Ziv/Lempel algorithm, among others. Compression and blocking of small rows into larger messages also has the effect of reducing the amount of data that needs to be transferred over the network significantly, and proportionally enlarges the capacity of data to compare.

As it receives compressed row hash blocks, the CC decompresses the blocks and de-blocks the messages into individual rows. The CC may perform all communications and de-blocking activity for each HS process in a separate processing thread to maximize parallelism and throughput of the compare (getting multiple processors to work on comparison tasks at the same time). Rows are sorted in unique key order from both DB1 and DB2.

The row comparison thread within the CC then compares rows from table 1 with rows in table 2. Table 1 is designated as the "source table" (ST) and table 2 is designated the "target table" (TT). The comparison proceeds as follows:

out-of-sync rows are accumulated, in order, to a "maybe out of sync queue" (MOOSQ)
   the keys and hashes for the rows compared are stored
   a timestamp of when the comparison was performed is stored
   the MOOSQ can be a memory queue, a file, or equivalent mechanism for storing row comparison data as rows are found out of sync
initially, a row from both ST and TT is retrieved
the comparison then performs the following loop until no more rows are available from either ST or TT
   current row is designated row(ST) or row(TT)
   next row (following current) is next row(ST) or next row (TT)
   unique key of current row is key(ST) or key(TT)
   hash of current row is hash(ST) or hash(TT)
   if key(ST) is less than key(TT) or no more rows are available from TT
      queue row(ST) as a "missing insert" operation into MOOSQ (see below)—this means that to bring tables in sync, the row(ST) must be inserted into TT
      row(ST) becomes next row(ST)
   if key(ST) is greater than key(TT) or no more rows are available from ST
      queue row(TT) as a "missing delete" operation into MOOSQ—to bring tables in sync, row(TT) must be deleted
      row(TT) becomes next row(TT)
   if key(ST) is equal to key(TT)
      if hash(ST) is different then hash(TT)
         queue row(ST) as a "missing update" operation into MOOSQ—to bring tables in sync, row(ST) must replace row(TT)
      if hash(ST) is equal to hash(TT)
         nothing to do, rows are in sync
      in both cases, row(ST) becomes next row(ST) and row (TT) becomes next row(TT)

After the comparison, the MOOSQ holds the keys to all rows that were found to be out of sync. Each of these keys can then be used to select the full row image from the database, to produce a list of rows that are out-of-sync.

Consider the following example, which relies upon the Source Table (ST) of Table 12 and the Target Table (TT) of Table 13.

Source Table (ST)

TABLE 12

|  | Product Number | Product Name | Number of Wheels | Row Hash |
| --- | --- | --- | --- | --- |
| Row 1 | 100 | Car | 4 | 12345678 |
| Row 2 | 200 | Boat | 0 | 63482133 |
| Row 3 | 300 | Truck | 18 | 34747426 |
| Row 4 | 400 | Bicycle | 2 | 98765342 |
| Row 5 | 500 | Helicopter | 3 | 98878972 |

Target Table (TT)

TABLE 13

|  | Product Number | Product Name | Number of Wheels | Row Hash |
| --- | --- | --- | --- | --- |
| Row 1 | 100 | Car | 4 | 12345678 |
| Row 2 | 150 | Motorcycle | 2 | 23823283 |
| Row 3 | 200 | Boat | 0 | 63482133 |
| Row 4 | 300 | Truck | 6 | 49347234 |
| Row 5 | 500 | Plane | 3 | 23823932 |

Comparison Steps

TABLE 14

|  | Source Row Key | Target Row Key | Source Row Hash | Target Row Hash | Operation Type |
| --- | --- | --- | --- | --- | --- |
| 1 | 100 | 100 | 12345678 | 12345678 | equal |
| 2 | 200 | 150 | 63482133 | 23823283 | missing delete |
| 3 | 200 | 200 | 63482133 | 63482133 | equal |
| 4 | 300 | 300 | 34747426 | 49347234 | missing update |
| 5 | 400 | 500 | 98765342 | 23823932 | missing insert |
| 6 | 500 | 500 | 98878972 | 23823932 | missing update |
| 7 | no more | no more |  |  | (done) |

MOOSQ Contents after Comparison

TABLE 15

|  | Source Row Key | Target Row Key | Source Row Hash | Target Row Hash | Operation Type | Compare Timestamp |
| --- | --- | --- | --- | --- | --- | --- |
| 1 |  | 150 | 63482133 | 23823283 | missing delete | 2004-May-04 08:33:32 |
| 2 | 300 | 300 | 34747426 | 49347234 | missing update | 2004-May-04 08:34:10 |
| 3 | 400 |  | 98765342 |  | missing insert | 2004-May-04 08:37:58 |
| 4 | 500 | 500 | 98878972 | 23823932 | missing update | 2004-May-04 08:39:00 |

The above row hash technique can be applied to the overlapping table scenarios described earlier, including:
- overlapping columns case
- overlapping rows case
- mapped data case
- heterogeneous data stores In the overlapping columns and mapped data cases, the user of the system supplies the overlapping column list, which acts as a comparison filter. As another alternative, the column list could also be derived automatically from an index used on the table, or a view on the table. Each column in the overlapping column list has the same information in each table (for in-sync rows), and limits the row hash calculation to those columns only, filtering out the columns that are different.

Consider the Overlapping Columns Case described earlier. The overlapping columns list would be the following:

TABLE 16

|  | Source Table Column (PROD) | Target Table Column (PRODUCT) |
| --- | --- | --- |
| 1 | Product Number | Product Number |
| 2 | Product Name | Product Name |
| 3 | Number of Wheels | Wheel Count |

Note that even though Number of Wheels and Wheel Count have different names, they represent the same information. In addition, In Stock has been omitted from the PROD table list because it does not overlap with any column in PRODUCT, and Description is omitted from the PRODUCT table list because it does not have an overlapping column in PROD.

In the overlapping rows case, the user of the system applies a filter definition to the row set returned for comparison. This could be an SQL statement WHERE clause, an identifier specifying the name of a physical or logical partition within the table, or other type of mechanism used to retrieve and present specific subsets of rows from the tables in the comparison.

Using the Overlapping Rows Example presented earlier, the following filters would be applied:
on the BASEBALL_TEAMS table, only select rows where Region is equal to "WEST"
on the WEST_TEAMS table, only select rows where Team Type is equal to Baseball In addition, only the Team Name and Wins columns overlap. The resulting row sets to compare would be:

BASEBALL_TEAMS Table

TABLE 17

|  | Team Name | Wins |
| --- | --- | --- |
| Row 1 | Giants | 82 |
| Row 3 | Dodgers | 63 |

(rows 2 and 4 filtered out because Region not equal to "WEST", Region column filtered because it does not overlap)

WEST_TEAMS Table

TABLE 18

|  | Team Name | Wins |
| --- | --- | --- |
| Row 1 | Giants | 82 |
| Row 2 | Dodgers | 60 |

(row 3 filtered out because Team Type does not equal "Baseball", Team Type column filtered out because it does not overlap)

With Heterogeneous Data Stores, each column must be converted to a standard representation for its basic "type" before performing the hash calculation. Otherwise, column data that means the same thing but is represented differently will result in unequal hash values for corresponding rows.

In the example provided earlier, numbers and dates are converted to a standard format. Standard formats can vary widely, but need to be defined for the following data types minimally:

numbers dates character columns that have trailing spaces

As long as the standard selected is consistently applied for both tables, and therefore that data is represented consistently for both tables, accurate hash calculation and comparison can take place.

One example format for number representation is the following:

truncate leading zeros truncate trailing zeros to the right of the decimal point An example format for date representation is:

4 digit year, followed by 2 digit month, followed by 2 digit day of month (YYYYMMDD)

Using the Heterogeneous Data Stores example, data is standardized for both ORACLE_ORDER and SYBASE_ORDER tables as follows.

TABLE 19

|  | Order ID | Order Date |
| --- | --- | --- |
| Row 1 | 100 | 2004AUG04 |
| Row 2 | 200 | 2003NOV10 |

In some cases, tables with large numbers of rows spread over a number of disk drives (partitioned tables) can be processed more quickly if the comparison process is broken into multiple pieces, each one of which focuses on one or more table partitions. This can be done by creating multiple logical comparisons for a partitioned table, each of which is responsible for a given range of data. This method is similar to the Overlapping Rows case, where a filter is used for each comparison. For example:

Source Table (ST):

TABLE 20

|  | Last Name |
| --- | --- |
| Partition 1 | "A"-"M" |
| Partition 2 | "N"-"Z" |

Target Table (TT):

TABLE 21

|  | Last Name |
| --- | --- |
| Partition 1 | "A"-"G" |
| Partition 2 | "H"-"R" |
| Partition 3 | "S"-"Z" |

The comparison on this table could be broken up into two comparisons:

comparison 1: select rows from both ST and TT where last name is between "A" and "M"

comparison 2: select rows from both ST and TT where last name is between "N" and "Z"

If the "split comparisons" are run at the same time, retrieval of row ranges "A"-"M" and "N"-"Z" can occur in parallel, because they access different disk drives. Note that the partitions don't have to be identical in order to implement a split comparison.

The row hash technique illustrates an efficient method for determining out-of-sync rows. However, if the row hash technique is applied while the underlying tables are changing, it can produce inconclusive results. This is due to the fact that underlying row values change while a comparison takes place, and therefore, the comparison can identify rows as out of sync that actually became in sync during the comparison; any underlying replication mechanism used to keep tables in sync may introduce a delay (latency) between the time at which a source row changes and the time when that change is applied at the target table.

One technique associated with the invention is used to complement the row hash technique and produce accurate results in changing environments. This is known as "Confirm Out of Sync" Processing (COOS), which may be implemented with the synchronization re-check module 160. The goal of this processing is to reveal the rows that remain out of sync after a period of time, in any of the following formats (but not limited to these):

a report to be reviewed by the user a queue or file (confirm out of sync queue, or COOSQ) that contains a list of out of sync and possibly out of sync rows that can be processed by another mechanism, such as a program to resynchronize the tables on a row-by-row basis the COOSQ can also be used as input to another COOS process to see which rows remain out of sync after another period of time or after a resynchronization step is applied In one embodiment of the invention, there are three possible statuses for rows processed in the COOS step:

"persistently out of sync"—means that the row has not been updated since the row hash comparison took place, and therefore can be assumed to be out of sync "in flight"—means that the target row that was out of sync in the row hash step has since been updated, and therefore that work has been performed on this row by replication or other mechanism, but it has not been confirmed that the rows were in sync "in sync"—means that the source row was applied to the target via the replication mechanism Note that even a status of "in sync" does not guarantee that the rows are currently in sync, if the underlying tables are continuously changing. But it does indicate that replication or other associated processing to keep rows in sync is working.

COOS processing assumes:

that there is another active mechanism for keeping rows in sync (for example, database replication)—known generically as a "replication mechanism"

that there is a high probability for the replication mechanism to apply application of a change in one table to the other table within a certain window of time (known as "replication latency")

this latency can be determined programmatically by reviewing latency statistics from the replication mechanism, or manually by a user in the absence of such a mechanism In one embodiment, COOS Processing works as follows:
while there are MOOSQ records left to process
get the next record from the MOOSQ
if out of sync operation type (optype) is
  "missing delete"
    use key(TT) to select the full row(TT) from TT
    if row(TT) is not found, then status becomes "in sync", otherwise, row(TT) is "persistently out of sync"
  "missing insert"
    use key(ST) to select the full row(TT) from TT
    if row(TT) is not found, then status becomes "persistently out of sync"
    if row(TT) is found, compute hash(TT)
      if hash(TT) is the same as hash(ST), then status becomes "in sync"
      if hash(TT) is different than hash(ST), then status becomes "in flight"
  "missing update"
    compute hash(TT)
    if hash(ST) is equal to hash(TT), then status becomes "in sync"
    if hash(ST) is not equal to hash(TT)
      compare the old hash(TT) with new hash(TT) if the same, then status becomes "persistently out of sync"
      if different, then status becomes "in flight" (if the hash changed, it means that the target row value changed, and that the database replication mechanism if any has updated the row and is likely working, but it has not been confirmed that the data is the same)
for rows that are persistently out of sync, and optionally in flight
  COOS can use key(TT) to lookup all corresponding columns values for row(TT), and key(ST) to lookup all corresponding column values for row(ST)
    only the key and hash were available in the MOOSQ, and therefore, to see the whole row image this is a necessary step
    lookup is done using standard database access methods such as SQL SELECT . . . WHERE At this point, the COOSQ and/or COOS report contains or displays the contents of all rows that are persistently out of sync, and if desired, those rows that are in flight.

Note that the COOS processing can occur simultaneously with the row hash or other initial comparison technique, as long as the COOS processing waits to perform each row confirmation step until after replication latency has expired. For example, if replication latency is 60 seconds, and the initial compare revealed an out of sync row at 9:30, then the confirmation step for that row is not performed until 9:31 (even if the initial comparison for all rows in the table is not complete until 9:33).

Consider the following example. Expected latency is set by the user to be 60 seconds.

MOOSQ Contents after Row Hash Comparison

TABLE 22

|   | Source Row Key | Target Row Key | Source Row Hash | Target Row Hash | Operation Type | Time |
|---|---|---|---|---|---|---|
| 1 |   | 150 | 63482133 | 23823283 | missing delete | 08:33:32 |
| 2 | 300 | 300 | 34747426 | 49347234 | missing update | 08:34:10 |
| 3 | 400 |   | 98765342 |   | missing insert | 08:37:58 |
| 4 | 500 | 500 | 98878972 | 23823932 | missing update | 08:39:00 |

Replication Activity

TABLE 23

|   | Source Row Key | Target Row Key | Source Row Hash | Target Row Hash | Activity | Time |
|---|---|---|---|---|---|---|
| 1 |   | 150 |   | 23823283 | applied delete | 08:33:50 |
| 2 | 300 | 300 | 34747426 | 34747426 | applied update | 08:34:20 |
| 3 | 500 | 500 | 98878972 | 66554443 | applied update | 08:34:20 |

COOS Activity

TABLE 24

|   | Source Row Key | Target Row Key | Time | Operation | Result | New Status |
|---|---|---|---|---|---|---|
| 1 |   | 150 | 08:34:33 | lookup TT key = 150 | Record not found | in sync |
| 2 | 300 | 300 | 08:35:11 | lookup TT key = 300 | Record found, new hash(TT) equals hash(ST) | in sync |
| 3 | 400 |   | 08:38:59 | lookup TT key = 400 | Record not found | persistently out of sync |
| 4 | 500 | 500 | 08:40:01 | lookup TT key = 500 | Record found, new hash(TT) not equal to hash(ST), but new hash(TT) not equal to old hash(TT) | in flight |

Description of COOS Activity
  retrieve MOOSQ record 1
    wait until current time (8:33:33) is greater than compare time plus latency (8:33:32+60) to allow replication a chance to apply operation
    uses target row key value of 150 to perform a lookup into the target table
    does not find the target record, so assumes delete has been applied
    marks the operation as now "in sync"
  retrieve MOOSQ record 2 wait until current time (8:35:11) is greater than compare time plus latency (8:34:10+60) to allow replication a chance to apply operation uses target row key value of 300 to perform a lookup into the target table finds the target record; computes a row hash (new hash) on the target table compares the hash of the source row with the new hash of the target row, they are the same marks the operation as now "in sync"

retrieve MOOSQ record 3 wait until current time (8:38:59) is greater than compare time plus latency (8:38:58+60) to allow replication a chance to apply operation uses source row key value of 400 to perform a lookup into the target table does not find the target record, so assumes missing insert has not been applied marks the operation as "persistently out of sync"

retrieve MOOSQ record 4 wait until current time (8:40:01) is greater than compare time plus latency (8:39:00+60) to allow replication a chance to apply operation uses target row key value of 500 to perform a lookup into the target table finds the target record; computes a row hash (new hash) on the target table compares the hash of the source row with the new hash of the target row, they are different, but since the new hash has changed in the target row since the initial compare, the row must have changed since the initial compare, and so the operation is marked as "in flight"

As described, the COOS Processing technique can be performed using the MOOSQ output from the Row Hash technique as input. COOS Processing uses the row keys, hashes and related information produced by the Row Hash technique to determine which rows are possibly out of sync, and to then use that information to lookup the detailed row data after probable replication latency has expired.

However, COOS Processing is not limited to Row Hash technique input. COOS Processing can be applied to any input in which the key of the out of sync data is supplied, for those rows that are only found in the source table (missing insert) or the target table (missing delete). For those rows that are in both tables, but that have different values in non-key columns, the data for the non-key columns does not have to be a row hash—it can be anything that represents the value of those columns, including the column values themselves. As long as the data is represented consistently on source and target, this is sufficient for the confirmation processing to take place.

In an alternative embodiment of the invention, tables are compared using a batch hash technique. In one embodiment, the batch hash technique is broken into two phases for descriptive purposes (although they may be run simultaneously):
1. Bad Batch Determination
2. Row Detail Fetch and Compare Once these phases are completed, a MOOSQ holds the "maybe out of sync" row set (as with the Row Hash technique). From there, the confirm out of sync (COOS) step described earlier can be run to determine the row set that remains persistently out of sync, even while the underlying databases continue to change.

Bad Batch Determination may be implemented as follows. As with the Row Hash technique, Host Server processes retrieve rows from the source and target tables. The column data for each row is standardized after selection to allow for heterogeneous cases, as illustrated earlier. In addition, features enabling overlapping rows and columns apply equally to the Batch Hash technique—specific row and column subsets can be selected from each table.

The aim of this technique is to reduce network traffic even further than the Row Hash. In a batch hash, the flow of data occurs as follows. Rows retrieved from the source and target tables (ideally in parallel) are loaded into row read buffers in each HS process:

rows are retrieved from the source table in unique key order, as with the Row Hash technique ideally, row retrieval from source and target tables will occur in parallel in HS1 (e.g., DB1 118) and HS2 (e.g., DB2 138)

Using the retrieved rows, HS1 subsequently builds and sends batches of row information to HS2:

a fixed number N is chosen for the "source batch size" (for example, 10 rows)

the first N rows in the row read buffers on HS1 are packed into a "batch row record", in the following manner:
   the beginning key column values (row 1)
   the ending key column values (row N)
   a hash, computed over all columns (or selected columns) in the N rows, using the hash techniques illustrated in the row hash technique (for example, a CRC)
   the batch row record is queued into a batch hash block this is repeated for rows N+1 through 2N, 2N+1 through 3N, and so on the last batch is a special case, and the final source batch row record has an ending key value denoted as "end of file"

whenever the batch hash block is full, or when local row read buffers are at or near full, the batch hash block is sent to the HS2 process
   fullness should be configurable and is typically optimized to achieve the maximum throughput of data on a network, or when row reading buffers are at or near full
   the blocks may be compressed for further efficiency HS2 reads and compares the batch row records with its own rows (from the target table):

HS2 reads the row data for the target table in unique key order each batch row record is de-blocked from the incoming message from HS 1 for each batch row record coming from HS 1:
   HS2 determines the boundaries of the batch row comparison, i.e. the set of rows in HS2 that need to be matched with the source batch row record
      the beginning row of the target batch row record is the first available row from the target table (TT)
      the ending row of the target batch row record is the row with a key less than or equal to the last row of the source batch row record
   HS2 also computes a hash over all rows in its set of rows
   HS2 then compares the hash of the source batch row record with the hash of the target batch row record
   if they are different, the batch is declared "bad"—this means that at least one row in the underlying row set is out of sync, and perhaps more; a bad batch record is then created, which consists of:
      the "lesser" of the keys that begin the source and target batch row records—the begin bad batch value
      the "greater" of the keys that end the source and target batch row records—the end bad batch value (note that this must always be the same as the ending key values of source batch row record)

if the source batch row record indicates "end of file" as the ending key value, the target batch row record must also indicate "end of file" as its ending key value the bad batch record is sent (or buffered for sending) to the CC process The CC process in turn writes the bad batch record into the Maybe Out of Sync queue (MOOSQ). The MOOSQ holds the boundaries for batches that are out of sync. This means that at least one row per batch was out of sync, and perhaps more.

At this point, a second step occurs to determine the exact row set that is out of sync. This step is known as "row detail fetch". This step can be performed after determining all bad batches or during that process. Determining the rows that are out-of-sync after determining each bad batch follows much of the same logic as the row hash technique. The processing occurs as follows:

bad batches are retrieved by the CC the CC requests the underlying row detail (each row's columns) from both the source (HS1) and the target (HS2)

each HS process formulates a query to return each row that is in the range of the bad batch record; for example, if a bad batch record has a beginning record with key 'B' and ending record with key 'E', then anything between those key values (inclusive) will be returned (for example, B,C,D,E)

alternatively, if the same HS processes are used in both the batch retrieval step and the row detail fetch step, the HS process can cache the detailed row data during batch retrieval, anticipating that the detail might be required the rows are returned to the CC the CC compares each row, as in the row hash step, and if the rows don't match, the CC outputs the bad row values to the MOOSQ At this point, the MOOSQ contains the rows that "maybe out-of-sync" (as in the row hash technique). From there, if the underlying tables are being updated continuously, the technique for "Evaluating Out-of-Sync Conditions for Continuously Changing Tables" can be applied after a period of configurable latency, as described earlier.

The Batch Row technique is more fully appreciated in connection with the following example. Consider:

Batch Size=3

Blocking=1 bad batch record (for simplicity)

Source Table (ST) Contents

TABLE 25

| Key | Other Values | Batch # | Batch row record contents | Comments |
|---|---|---|---|---|
| A | 1 | 1 | | |
| B | 2 | 1 | | |
| C | 3 | 1 | A, C, Hash(1, 2, 3) | End of batch 1 (count = batch size) |
| D | 4 | 2 | | |
| F | 5 | 2 | | |
| G | 6 | 2 | D, G, Hash(4, 5, 6) | End of batch 2 (count = batch size) |
| H | 7 | 3 | H, EOF, Hash(7) | End of batch 3 = EOF |

Target Table (TT) Contents

TABLE 26

| Key | Other Values | Batch # | Batch row record contents | Comments |
|---|---|---|---|---|
| A | 1 | 1 | | <= end key of source batch 1 (C) |
| C | 3 | 1 | A, C, Hash(1, 3) | <= end key of source batch 1 - mismatched batch row records (Hash(1, 2, 3) not equal to Hash(1, 3) - output to BBQ |
| D | 4 | 2 | | > end key of source batch 1, <= end key of source batch 2 (G) |
| F | 5 | 2 | | <= end key of source batch 2 (G) |
| G | 6 | 2 | D, G, Hash(4, 5, 6) | <= end key of source batch 2 (G) - matched batch row records (Hash(4, 5, 6) in both source, target) - good batch (throw out) |
| H | 7 | 3 | | > end key of source batch 2, <= end key of source batch 3 (EOF) |
| I | 8 | 3 | H, EOF, Hash(7, 8) | <= end key of source batch 3 (EOF) - mismatched batch row records (Hash(7) not equal to Hash(7, 8) - output to BBQ |

HS1 extracts the first 3 records from ST—keys=A,B,C—and computes the hash over those three records. The batch row record contains:

begin key columns value—A end key columns value—C hash (1,2,3)

HS1 sends the batch row record to HS2. HS2 performs the following processing:

reads the first row from TT (key-A) and compares it to the end key value (C) of the bad batch row from HS2—since it is less or equal to end key C, the row is included in the current batch for the target reads the second row from TT (key=C)—also includes this row, since it is less than or equal to end key C reads the third row from TT (key=D)—saves this for the next batch comparison computes the hash over records A, C—and this is different than the source batch row record hash (hash(1,3)), because a row is missing in the target batch that existed in the source (key=B)

the batch row record containing A, C is output to the Bad Batch Queue (BBQ)

HS1 then builds the next batch record from the next 3 rows in ST:
begin key=D
end key=G
hash (4,5,6)
HS1 sends the batch row record to HS2. HS2 performs the following processing:
uses the remaining row from TT that didn't make it into the prior batch (key=D)
accumulates rows until it finds one greater than the end key from the source batch record (key=H); includes every row up to and including G in the target batch row record
computes the target row hash—hash(4,5,6)—which matches the source batch row record hash, and determines that this batch is "good"
HS1 builds and sends the last batch to HS2. The batch contains the following:
begin key=H
end key=EOF
hash (7)
HS2 includes all remaining rows in its batch row record calculations, because the end key from the source batch row record is EOF. These records don't match because the target batch row hash is hash (7,8). This record is put into the BBQ.

In the row detail fetch step, each bad batch record is retrieved from the BBQ by the CC. The CC retrieves the row detail for the implied row set bounded by begin and end key values, from each of HS1 and HS2. Once rows have been retrieved, they are compared in the order retrieved.

Comparison Processing

TABLE 27

| Bad Batch Record Values (begin key, end key) | Source Row Detail | Target Row Detail | Result |
|---|---|---|---|
| A, C | A, 1 | A, 1 | Equal |
| | B, 2 | C, 3 | Missing Insert (B < C) - output B, 2 to MOOSQ |
| | C, 3 | C, 3 | Equal |
| H, EOF | H, 7 | H, 7 | Equal |
| | EOF | I, 8 | Missing Delete - output I, 8 to MOOSQ |
| | EOF | EOF | Done |

The MOOSQ at this point contains the rows that maybe out of sync. A subsequent comparison can be performed after a period of latency, as described subsequent to the row hash above, to identify the rows that remain out of sync (and were not brought into sync by replication or a similar mechanism).

The compare techniques illustrate methods for identifying rows in two tables that should be in sync, but are not. These techniques also identify ways to do so when the underlying data is changing constantly.

Once two tables are identified as out-of-sync, it is a frequent requirement to bring them back into synchronization. This involves:

deciding which rows should be synchronized (either on a row-by-row basis, using a data-driven rule, or all rows)—known as the "resync rowset"

for each row in the resync rowset, deciding which table is the true source of change information (this may be on a row-by-row basis, a data-driven rule, or all rows flowing in one direction)

actually moving the change information from source to target, or triggering this movement, bringing individual rows into sync In one embodiment of the invention, an Out-of-Sync Queue (OOSQ) is used as input to the resynchronization process. The OOSQ provides at least the minimally necessary attributes, including each row key and operation type, for those rows that may possibly be resynchronized. Many different types of processes may generate the OOSQ, including the compare processes that generate the MOOSQ and COOSQ queues described above.

Determining the resync rowset and directional flow of data to synchronize is the first step in bringing tables back into sync. The final set of rows to resync is known as the "Resync Queue" (RQ). This can take many forms, including files and queues, but contains the essential information needed to affect the resynchronization process for the necessary rows. The RQ and OOSQ can even be the same files. The RQ can also be thought of as a logical concept if the application of changes is made immediately upon determination of whether and how to apply each change.

Determining the contents of the Resync Queue can be done in the following ways. Default action is one approach. During the comparison process, one table is designated as the source and the other table is the designated target. The default action is to flow every row in the resync rowset from the source to the target. Another approach is to present rows to the user for manual inspection and determination. In this method, the system presents data from the OOSQ described above to the user of the system. If the operation was a missing insert, the source row is displayed; for missing deletes, the target row is displayed, and for missing updates, both source and target rows are displayed, with one option being to highlight the out-of-sync columns for the user's attention.

As the user inspects each row, he can determine 1) whether to resynchronize that row and 2) in which direction to send the row (i.e. determine the "true" source). Note that while a source and target for the comparison have been assumed, the manual inspection process can reverse this relationship on a case-by-case basis. The system stores these settings into the RQ (which is possibly the OOSQ itself or a new file/memory queue) so that the row can be synchronized later. Alternatively, the system can execute these changes directly after the review is complete without storing the directional information.

Another method of determining whether to apply the row, and in which direction, is using data-driven rules. In this scenario, the system provides a mechanism by which users can specify subsets of rows within the OOSQ to apply. There are many options for implementing a syntax that enables this function, or providing a user interface that prompts for this information.

Consider the following example. When in sync, ALL_CITIES_EAST and ALL_CITIES_WEST should have the same data. Assume ALL_CITIES_EAST was designated the source table, and ALL_CITIES_WEST the target. Also assume that data on a given city always originates in the copy of the table for that region (for example, data on New York always originates in ALL_CITIES_EAST).

ALL_CITIES_EAST Table (designated source table)

TABLE 28

|   | City | Region | Weather |
|---|------|--------|---------|
| 1 | New York | East | Rain |
| 2 | Miami | East | Sunny |
| 3 | Chicago | Central | Windy |

ALL_CITIES_WEST Table (designated target table)

TABLE 29

|   | City | Region | Weather |
|---|------|--------|---------|
| 1 | Seattle | West | Rain |
| 2 | Philadelphia | East | Snow |
| 3 | Miami | East | Cloudy |

OOSQ Contents and Desired Outcome

TABLE 30

|   | City | Region | OOSQ Operation | Desired Operation |
|---|------|--------|----------------|-------------------|
| 1 | New York | East | missing insert | insert row into ALL_CITIES_WEST |
| 2 | Philadelphia | East | missing delete | delete row from ALL_CITIES_WEST |
| 3 | Miami | East | missing update | replace row in ALL_CITIES_WEST |
| 4 | Seattle | West | missing delete | insert row into ALL_CITIES_EAST |
| 5 | Chicago | Central | missing insert | do nothing |

Note that in all cases except #4 and #5 of Table 30, data is flowing in the direction from the designated source to target. However, in case #4, since Seattle is in the West region, that data should be inserted into ALL_CITIES_EAST, rather than having the row deleted from ALL_CITIES_WEST. Case #5 is used to illustrate a case where one might not want to apply data in either direction. Therefore, an automatic rule for determining directional data flow might be as follows:

for each record in the OOSQ
if Region is East, direction of change is from ALL_CITIES_EAST to ALL_CITIES_WEST
if Region is West, direction of change is from ALL_CITIES_WEST to ALL_CITIES_EAST
if Region is Other, do not apply change in either direction The system can enable rules that involve Boolean logic on a combination of the table data, operation type, compare timestamp and other information, enabling or disabling resynchronization for row sets and determining the directional flow of those rows. A more sophisticated rule example:

if Region is East, and OOSQ Operation is not missing delete, or city is New York, then apply change to ALL_CITIES_WEST 1. Combination of Rule Based and Manual Review Techniques The system can also provide the option of extending the rules specification capabilities to enable manual inspection and determination for rows that are not determined by the rules themselves. Using the above example, a rule might specify:

for each record in the OOSQ
if Region is East, direction of change is from ALL_CITIES_EAST to ALL_CITIES_WEST
if Region is West, direction of change is from ALL_CITIES_WEST to ALL_CITIES_EAST
if Region is Other, make a manual determination Rows may also be resynchronized through a direct application technique. In one embodiment, this technique involves the following:

read the RQ for each intended change
using the column values, key information and operation type, update either the source or target table, using the native methods available for that database For SQL databases, this involves the following steps:
for missing inserts, build the following syntax:
insert into <table> (<column1> [,<column2> ... ]) values (<column value1> [, <column value2> ... ])
example: insert into PRODUCT (Name, Price) values ('CAR', 32000)
for missing updates, build the following syntax:
update <table> set <column1>=<column value1> [,<column2>=<column value2>] where <key column1>=<key column1 value> [and <key column2>=<key column2 value>
example: update PRODUCT set Price=32000 where Name='CAR'
for missing deletes, build the following syntax:
delete from <table> where <key column1>=<key column1 value> [and <key column2>=<key column2 value>
example: delete from PRODUCT Name='CAR'

<column 1> ... <column n> is the list of columns in the table, whose values were available in the original comparison step. <column value 1> ... <column value n> are the corresponding column values.

<key column 1> ... <key column n> is the list of columns that comprise the unique key used in the comparison. <key value 1> ... <key value n> are the corresponding values.

In one embodiment, rows are resynchronized by:
build the SQL statement syntax
send the SQL statement to the database's SQL executor
commit each operation either independently or as part of a larger group of operations Other databases support similar functionality to SQL for deleting, inserting and updating particular rows. These include various ISAM methods and different database APIs. The same general methods for applying row changes apply for these types of tables. Methods for setting particular columns or fields and updating these types of databases are commonly known and available.

In many common environments and architectures, two databases are kept closely in sync at any given time using database replication methods. In these types of scenarios, when a row change is applied at the data source, it is typically applied by the replication mechanism at the target after some delay (ranging from milliseconds to days).

Data applied this way presents challenges for a resynchronization mechanism. Consider the following set of events.

TABLE 31

| Time | Event | Source Key, Column Value | Target Key, Column Value |
|------|-------|--------------------------|--------------------------|
| 1 | rows in sync | 100, CAR | 100, CAR |
| 2 | source row update | 100, TRUCK | 100, CAR |
| 3 | compare detects missing update condition | 100, TRUCK | 100, CAR |
| 4 | target row updated by replication | 100, TRUCK | 100, TRUCK |

TABLE 31-continued

| Time | Event | Source Key, Column Value | Target Key, Column Value |
|---|---|---|---|
| 5 | source row update | 100, PLANE | 100, TRUCK |
| 6 | target row update by replication | 100, PLANE | 100, PLANE |
| 7 | resync applies old source row values | 100, PLANE | 100, TRUCK |

In this example, the comparison process correctly detects an out-of-sync condition at time 3 (replication has not yet applied the change from CAR to TRUCK to the target row). At time 4, the update on the source row at time 2 is finally applied to the target. Subsequent activity updates the source row values (time 5), and replication applies the new (correct) version of the data at time 6.

However, at time 7, the resynchronization step applies an outdated change to the target, erroneously overwriting the newest version of the record with an older version. This ensures data inaccuracy in the target row, at least until the next comparison and resynchronization take place, or until the row is updated and replicated again without intervening comparison and resync activities.

One aspect of the invention ensures an orderly change application in a replication environment. Because database replication can cause intervening updates of new information to a given row, the system needs to coordinate resync activities in order to prevent anomalies. The essential mechanism for accomplishing this is to cause the replication system to detect and apply the change itself.

Replication mechanisms typically detect operations in the order they are performed on the source database, and apply those changes in the same order at the target database. This guarantees that the target row will (eventually, after replication latency is accounted for), contain accurate information.

One mechanism to enable orderly application of changes is a source row update technique. Such a technique may be implemented as follows:
  get the key for the row that is out of sync from the RQ
  using the key value, update all columns in the row to themselves
  this triggers the database to log the current row values into the database transaction log or a similar mechanism (such as a change log maintained by triggers)
  subsequently the replication system reads and interprets the change event, and replicates the change into the target database Consider the following example:

TABLE 32

| Time | Event | Source Key, Column Value | Target Key, Column Value |
|---|---|---|---|
| 1 | rows in sync | 100, CAR | 100, CAR |
| 2 | source row update | 100, TRUCK | 100, CAR |
| 3 | compare detects missing update condition | 100, TRUCK | 100, CAR |
| 4 | target row updated by replication | 100, TRUCK | 100, TRUCK |
| 5 | source row update | 100, PLANE | 100, TRUCK |
| 6 | resync updates source row to itself (causing the current row values to be logged) | 100, PLANE | 100, TRUCK |
| 7 | replication detects the row values in the log and applies them to the target | 100, PLANE | 100, PLANE |

Note that, in contrast with the Direct Apply technique, here the accurate version of the row is applied, because replication found and applied the correct version of the row. Also note that the replication mechanism must have the following additional capabilities:
  the resync event is always an update to the row (setting the values to themselves);
  therefore, the replication mechanism must be able to detect whether or not the row actually exists at the target, and apply the row as an insert if it does not exist at the target One embodiment of the invention uses a source row marker technique. This technique is used because the Source Row Update technique is limited in the following manner:
  missing delete records cannot be recreated by updating the source row—therefore another mechanism is required for creating and handling deletes
  updates to rows can cause other unintended events to fire, such as database triggers
  there is no easy way to delineate between what activity was caused by the resync mechanism, and that which was caused by the application—either at the source end or by replication at the target The Source Row Marker technique accounts for these limitations. This technique also works in conjunction with replication to guarantee that changes are applied in the proper order. The technique works as follows:
  get the key for the row that is out of sync (from the RQ)
  if the operation type is a missing insert or missing update
  using the key value, select all of the columns from the source row, while locking that row (as an example, using SELECT FOR UPDATE or READ WITH LOCK)
  at a minimum, record the column values, along with the table name, and operation type into a RESYNC_MARKER table
  if the operation is a missing delete
  using the key value, select all of the columns from the source row, while locking that row (as an example, using SELECT FOR UPDATE or READ WITH LOCK)
  if the row exists, do nothing
  if the row does not exist, at a minimum, record the key column values, along with the table name, operation type or current time of day into a RESYNC_MARKER table
  commit the database transaction (either individually or in groups of resync operations)
  unlock any rows selected or read with locks The invention may be implemented with a RESYNC_MARKER table with the following characteristics:
  rows created within the table must be logged to either the database transaction log or equivalent (the replication change data source)—the transaction log must be the same as the transaction log used by the underlying source table
  it can store data for different table structures—it does not have to be the same structure as the underlying source table(s), as long as it can store the column values of the source table in some way, such as stringing them together into one large column Additional requirements for the replication mechanism:
  it must track changes made to the RESYNC_MARKER table
  it must know the purpose of the RESYNC_MARKER table and interpret its contents differently than it does for other tables—i.e., it translates the contents of each RESYNC_MARKER row (which is mostly likely a packing of multiple columns into a single column) into the appropriate source table format (unpacks the single column into the intended multiple columns)

it must be able to take the contents of each RESYNC_MARKER row, and rebuild the corresponding row/column values and equivalent change records internally it does not need to process delete rows in the RESYNC_MARKER table After this processing occurs for a particular row, the replication mechanism can process the data as it would a normal change record for the underlying row.

Finally, because the RESYNC_MARKER rows are only needed until replication has processed them, the replication mechanism can periodically delete no longer needed RESYNC_MARKER rows on a periodic basis.

Example:

TABLE 33

| Time | Event | Source Key, Column Value | Target Key, Column Value |
|------|-------|--------------------------|--------------------------|
| 1 | rows in sync | 100, CAR | 100, CAR |
| 2 | source row update | 100, TRUCK | 100, CAR |
| 3 | compare detects missing update condition | 100, TRUCK | 100, CAR |
| 4 | target row updated by replication | 100, TRUCK | 100, TRUCK |
| 5 | source row update | 100, PLANE | 100, TRUCK |
| 6 | resync selects the current values of the source row (with lock), then creates a RESYNC_MARKER row with those values | 100, PLANE | 100, TRUCK |
| 7 | resync commits and unlocks the RESYNC_MARKER row | 100, PLANE | 100, TRUCK |
| 8 | source row update | 100, BOAT | 100, TRUCK |
| 9 | resync marker row processed by replication | 100, BOAT | 100, PLANE |
| 10 | source row update processed by replication | 100, BOAT | 100, BOAT |

Note that in this example, the source row update at time 8 had to wait for the lock to be released for the source row read established at time 6 to ensure that the RESYNC_MARKER row is recorded in the database log. This guarantees that steps at times 9 and 10 will be performed in the correct order.

The foregoing discussion describes a technique in which a replication mechanism is used to facilitate both the ongoing synchronization of databases, as well as the resynchronization of those databases, in the event that a table comparison reveals out of sync rows. Assuming that the replication mechanism can also support synchronization for the heterogeneous and overlapping cases described earlier, and assuming that the mechanism supports the Source Row Marker technique above, the mechanism can also be used to synchronize heterogeneous tables and/or overlapping row/column sets. This is due to the fact that once a replication system has correctly interpreted the source row marker data, subsequent operations appear to the replication system as though they had originated in the underlying source table itself. Therefore, any heterogeneous and overlapping data differences that are already accommodated by the replication mechanism are transparently extended to the combined resync/replication mechanism.

The replication mechanism can also be used to create an audit trail of changes for rows created by the resync process. This allows users of the resync mechanism to delineate between rows produced by resync, and rows produced by replication or external applications.

The following steps, performed by the replication mechanism, establish an audit record in the target database transaction log for a particular row:

the RESYNC_MARKER row is fetched the row data is interpreted, and converted to resemble the underlying source row the target row is updated within the context of the same database transaction, a RESYNC_APPLY_MARKER row is created in the target database (its only purpose is to identify the transaction as having been caused by resync activities)

Once the record has been created in the target database transaction log, there are two ways for a user to access the data:

1. by looking at the RESYNC_APPLY_MARKER table itself;
2. by mining the transaction data from the target database transaction log; because an operation on the RESYNC_APPLY_MARKER table appears in the transaction, it can be assumed that all other operations in the transaction must have been produced by resync activities The second step above also has the advantage of not requiring redundant storage for the column information, since it is contained in the transaction log records (by virtue of the application of that row into the target database).

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer storage product with a computer readable medium having computer code executed by a computer, said computer code including executable instructions to compare databases, said computer code comprising executable instructions to:
- identify a segment of a first database comprising a batch of rows of said first database;
- compress said batch of rows of said first database;
- identify non-key data and key data in said compressed batch of rows of said first database, including a begin key value and an end key value;
- perform a hash on said identified non-key data to create first hash data;
- process at least said identified begin key value and said identified end key value to identify a corresponding segment of a second database;
- perform a hash on at least a portion of said identified corresponding segment of said second database to create second hash data;
- compare said created first hash data with said created second hash data to identify said identified segment of said first database is conditionally out of synchronization with said identified corresponding segment of said second database to establish a conditionally out of synchronization state at a first time;
- allow a latency period after said first time for said first database and said second database to synchronize through existing synchronization mechanisms;
- determine after said latency period that said identified segment of said first database is not in synchronization with said identified corresponding segment of said second database to form a post-latency out of synchronization state; and
- re-synchronize, in response to said post-latency out of synchronization state, said identified segment of said first database with said identified corresponding segment of said second database during dynamic operation of said first database and said second database.

2. The computer storage product with said computer readable medium of claim 1 wherein said executable instructions to identify include executable instructions to establish a common format for said segment of said first database and said corresponding segment of said second database.

3. The computer storage product with said computer readable medium of claim 2 wherein said executable instructions to identify include executable instructions to establish said common format between said first database and said second database accounting for at least one of: overlapping columns, overlapping rows, mapped data, and heterogeneous data stores.

4. The computer storage product with said computer readable medium of claim 1 wherein said executable instructions to identify include executable instructions to augment said created first hash data with user-specified non-key data.

5. The computer storage product with said computer readable medium of claim 1 wherein said executable instructions to identify include executable instructions to establish whether said segment of said first database includes rows or columns that at least partially overlap with corresponding rows or columns of said corresponding segment of said second database.

6. The computer storage product with said computer readable medium of claim 1 wherein said executable instructions to identify include executable instructions to compare sub-segments of said segment of said first database to corresponding sub-segments of said second database in parallel.

7. The computer storage product with said computer readable medium of claim 1 further comprising executable instructions to use said identified begin key value and said identified end key value to identify within said first database and said second database a set of rows corresponding said identified segment of said first database and said identified corresponding segment of said second database that are conditionally out of synchronization at said first time.

8. The computer storage product with said computer readable medium of claim 7 further comprising executable instructions to compare individual rows of said set of rows to identify rows that are conditionally out of synchronization.

9. The computer storage product with said computer readable medium of claim 1 wherein re-synchronizing includes executable instructions to:
- retrieve values from said identified segment of said first database;
- lock said identified segment of said first database; and
- store said retrieved values from said identified segment of said first database in a marker table associated with said first database.

10. The computer storage product with said computer readable medium of claim 9 further comprising executable instructions to:
- use a replication mechanism to propagate said stored retrieved values from said identified segment of said first database from said marker table to said identified corresponding segment of said second database.

11. The computer storage product with said computer readable medium of claim 10 further comprising executable instructions to:
- use said replication mechanism to sequence changes to said first database.

12. The computer storage product with said computer readable medium of claim 1 wherein said executable instructions to re-synchronize include executable instructions to access an out-of-synchronization queue specifying information about out-of-synchronization database segments.

13. The computer storage product with said computer readable medium of claim 12 wherein said executable instructions to re-synchronize include executable instructions to determine data directional flow.

14. The computer storage product with said computer readable medium of claim 1 wherein said executable instructions to re-synchronize include executable instructions to re-synchronize through a direct application technique that relies upon native methods associated with either said first database or said second database.

15. The computer storage product with said computer readable medium of claim 1 wherein said executable instructions to re-synchronize include executable instructions to re-synchronize using replication markers.

16. The computer storage product with said computer readable medium of claim 1 wherein said executable instructions to re-synchronize include executable instructions to re-synchronize using a source row update technique.

17. A method, comprising:
- identifying, at a computer system, a segment of a first database comprising a batch of rows of said first database;
- compressing said batch of rows of said first database;
- identifying non-key data and key data in said compressed batch of rows of said first database, including a begin key value and an end key value;
- performing a hash on said non-key data to create first hash data;
- processing at least said identified begin key value and said identified end key value to identify a corresponding segment of a second database;

performing a hash on at least a portion of said identified corresponding segment of said second database to create second hash data;

comparing said created first hash data with said created second hash data to identify said identified segment of said first database is conditionally out of synchronization with said identified corresponding segment of said second database to establish a conditionally out of synchronization state at a first time;

allowing a latency period after said first time for said first database and said second database to synchronize through existing synchronization mechanisms;

determining after said latency period that said identified segment of said first database is not in synchronization with said identified corresponding segment of said second database to form a post-latency out of synchronization state; and re-synchronizing, in response to said post-latency out of synchronization state, said identified segment of said first database with said identified corresponding segment of said second database during dynamic operation of said first database and said second database.

18. A computer system comprising a processor and a memory in communication with said processor, said memory having therein computer code executable by said computer system, said computer code comprising executable instructions to:

identify a segment of a first database comprising a batch of rows of said first database;

compress said batch of rows of said first database;

identify non-key data and key data in said compressed batch of rows of said first database, including a begin key value and an end key value;

perform a hash on said identified non-key data to create first hash data;

process at least said identified begin key value and said identified end key value to identify a corresponding segment of a second database;

perform a hash on at least a portion of said identified corresponding segment of said second database to create second hash data;

compare said created first hash data with said created second hash data to identify said identified segment of said first database is conditionally out of synchronization with said corresponding segment of said second database to establish a conditionally out of synchronization state at a first time;

allow a latency period after said first time for said first database and said second database to synchronize through existing synchronization mechanisms;

determine after said latency period that said identified segment of said first database is not in synchronization with said identified corresponding segment of said second database to form a post-latency out of synchronization state; and re-synchronize, in response to said post-latency out of synchronization state, said identified segment of said first database with said identified corresponding segment of said second database during dynamic operation of said first database and said second database.

\* \* \* \* \*

UNITED STATES PATENT AND TRADEMARK OFFICE
CERTIFICATE OF CORRECTION

| | | |
|---|---|---|
| PATENT NO. | : 7,788,225 B2 | Page 1 of 1 |
| APPLICATION NO. | : 11/084855 | |
| DATED | : August 31, 2010 | |
| INVENTOR(S) | : Eric Ian Fish et al. | |

It is certified that error appears in the above-identified patent and that said Letters Patent is hereby corrected as shown below:

In column 28, line 2, in claim 7, after "corresponding" insert -- to --.

Signed and Sealed this
Twenty-sixth Day of July, 2011

David J. Kappos
*Director of the United States Patent and Trademark Office*